Patented Oct. 19, 1926.

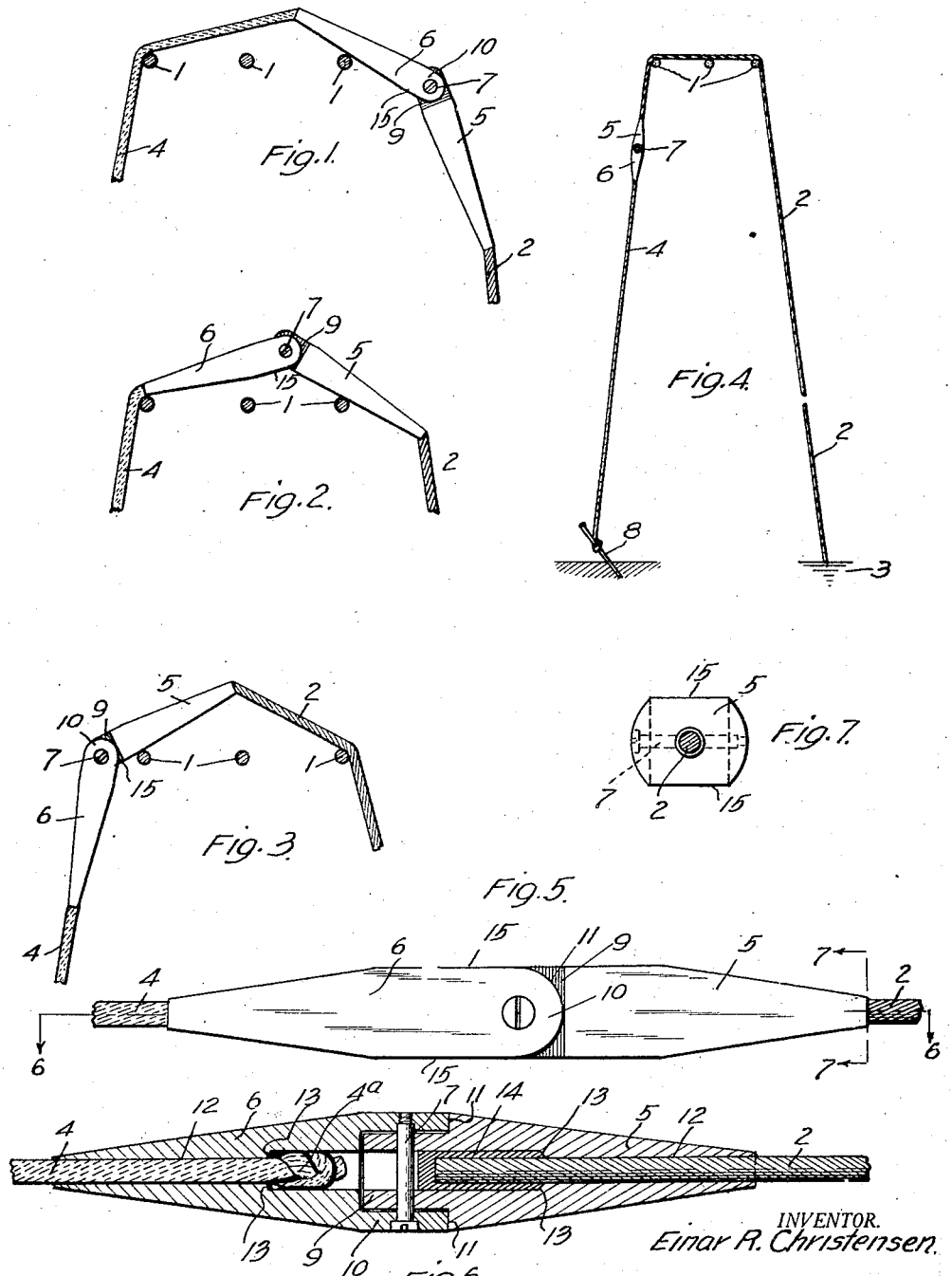

1,603,517

UNITED STATES PATENT OFFICE.

EINAR R. CHRISTENSEN, OF LOS ANGELES, CALIFORNIA, ASSIGNOR OF ONE-HALF TO ALBERT MALLNER, OF LOS ANGELES, CALIFORNIA.

SAFETY DEVICE.

Application filed July 2, 1925. Serial No. 41,089.

This invention relates to that type of safety device which comprises a ground connection adapted to be drawn over the wires of a high voltage line for electrical contact therewith so that if the circuit through the high voltage line is accidentally closed the current will be grounded before reaching a lineman working on the wires.

It is the object of the invention to provide means for drawing the ground connection over the electric line so as to prevent accidental disengagement of the ground wire from the hauling means, and which will afford leverage for drawing the ground connection taut with little effort and minimum strain upon the wires of the electric line.

The invention will be readily understood from the following description of the accompanying drawings, in which:

Figs. 1, 2, 3 and 4 are diagrammatic views showing the method of drawing the ground connection to operative position.

Fig. 5 is a side elevation of the connection between the ground wire and the hauling cable.

Fig. 6 is an axial section on the line 6—6 of Fig. 5.

Fig. 7 is a transverse section on the line 7—7 of Fig. 5.

The safety device is employed in connection with an electrical conductor shown as a high voltage line comprising wires 1 a spaced from one another and strung along above the ground in usual manner. A wire 2 which is grounded as shown at 3 is drawn across wires 1 so as to make electrical contact therewith, the wire 2 being positioned in advance of linemen working on the wires 1 so as to prevent injury to the linemen by grounding the current in the event that the circuit through wires 1 is accidentally closed.

In order to position the ground wire across the wires 1 a hauling means shown as a rope cable 4 is connected to the free end of wire 2, and the cable is thrown across the electric line so that a down-haul upon the cable will draw the ground wire taut across the wires 1.

The present invention provides a connection between wire 2 and cable 4 which will prevent disengagement of said parts and which affords a leverage for drawing the ground wire to operative position. As an instance of this arrangement lever arms 5 and 6 are pivotally connected by a pin 7, and the ground wire and the hauling cable are fixed to and project from the respective arms.

Down-haul upon cable 4 draws wire 2 upwardly toward the wires 1 of the electric line, and as arm 6 is drawn across the outer wire it is fulcrumed thereon so as to swing said arm relative to the arm 5 as shown in Fig. 1, thereby exerting a leverage for elevating arm 5 and the ground wire 2. After pivotal connection 7 is drawn over the outside wire 1, the lever arm 5 is fulcrumed on the wire as shown in Fig. 2, so that the swinging of said arm exerts a leverage for elevating the ground wire. When the pivotal connection 5—6 has been drawn across the electric line to the opposite outside wire 1, the continued down-haul upon cable 4 will successively fulcrum the lever arms upon said outside wire in order to exert a leverage for drawing the ground wire taut across the wires of the electric line as shown in Fig. 3. The ground wire is held taut in electrical contact with wires 1 so as to ground the same, by a suitable fastening means for cable 4, which is shown as a stake 8 adapted to be driven into the ground as illustrated in Fig. 4.

The connection between wire 2 and cable 4 is shown in detail in Figs. 5, 6, and 7. Levers arms 5 and 6 are preferably conical, and pivot pin 7 is received through a cooperating tongue 9 and forked end 10 at the butt ends of the conical arms. The ends of the fork and tongue are rounded off as shown at 11 to provide a snug engagement of said parts while permitting free relative swinging of the lever arms upon the pivot pin.

Wire 2 and cable 4 project from the opposite ends of the lever arms and are fixed in bores 12 extending through the arms. The bores have enlarged inner ends forming shoulders 13, and cable 4 is held in its bore by the abutment of a knot 4ª in the end of the cable against shoulder 13, while wire 2 is preferably held in place by soldering its end against the shoulder 13, as shown at 14.

The conical shape of arms 5—6 prevents the arms catching upon wires 1 as the ground connection is drawn into place, and also causes turning of the arms upon a longitudinal axis when arm 6 first engages the outer wire 1, until the pivot pin 7 is in a horizontal plane adapted for relative swinging of the lever arms as previously described. In order to maintain the pivot pin 7 in a horizontal plane for proper swinging movement of the lever arms, the sides of the latter may be flattened as shown at 15, adjacent the butt ends of the lever arms and in planes parallel to the axis of the pivot pin.

I claim:

1. A device of the character described comprising a ground wire, and leverage means adapted to fulcrum on an electrical conductor for drawing the ground wire upwardly and over the electrical conductor.

2. A device of the character described comprising a ground wire, hauling means, and a connection between the ground wire and hauling means adapted to fulcrum on an electrical conductor when the hauling means is tensioned in order to exert a leverage on the ground wire for drawing the same upwardly and over the electrical conductor.

3. A device of the character described comprising a ground wire, hauling means for drawing the ground wire over an electrical conductor, lever arms connected to said ground wire and hauling means and a pivotal connection between said lever arms.

4. A device of the character described comprising a ground wire, hauling means for drawing the ground wire over an electrical conductor, and conical lever arms pivotally connected at their butt ends with the ground wire and hauling means fixed to the respective arms and projecting beyond the opposite ends thereof.

5. A device of the character described comprising a ground wire, hauling means for drawing the ground wire over an electrical conductor, and pivotal lever arms having the ground wire and hauling means fixed to the respective arms, said arms being round in cross-section with the surfaces thereof flattened in planes parallel to the pivotal axis.

In testimony whereof I have affixed my signature to this specification.

EINAR R. CHRISTENSEN.